C. W. DAKE.
CAR SECTION.
APPLICATION FILED OCT. 1, 1915.

1,197,189.

Patented Sept. 5, 1916.

Witnesses:

Inventor:
Charles W. Dake
by Parker & Carter
his Attys.

UNITED STATES PATENT OFFICE.

CHARLES W. DAKE, OF CHICAGO, ILLINOIS, ASSIGNOR TO PYLE-NATIONAL ELECTRIC HEADLIGHT COMPANY, OF CHICAGO, ILLINOIS, A CORPORATION OF NEW JERSEY.

CAR-SECTION.

1,197,189.  Specification of Letters Patent.  Patented Sept. 5, 1916.

Original application filed January 29, 1915, Serial No. 5,004. Divided and this application filed October 1, 1915. Serial No. 53,488.

*To all whom it may concern:*

Be it known that I, CHARLES W. DAKE, a citizen of the United States, residing at Chicago, in the county of Cook and State of Illinois, have invented a certain new and useful Improvement in Car-Sections, of which the following is a specification.

This case is a divisional application of No. 5004, Charles W. Dake, car end, filed January 29, 1915.

My invention relates to car sections and has for its object to provide a stiffened insulated metal car end adapted to be secured in any desired manner to any kind of a car whether of metal or wooden frame.

It is illustrated in the accompanying drawings where I have shown the same as applied to the end of a car frame, but since the method of attachment is no part of my present invention, I have not shown any details thereof. Indeed, the drawings are to be taken as in a sense diagrammatic.

Figure 1:
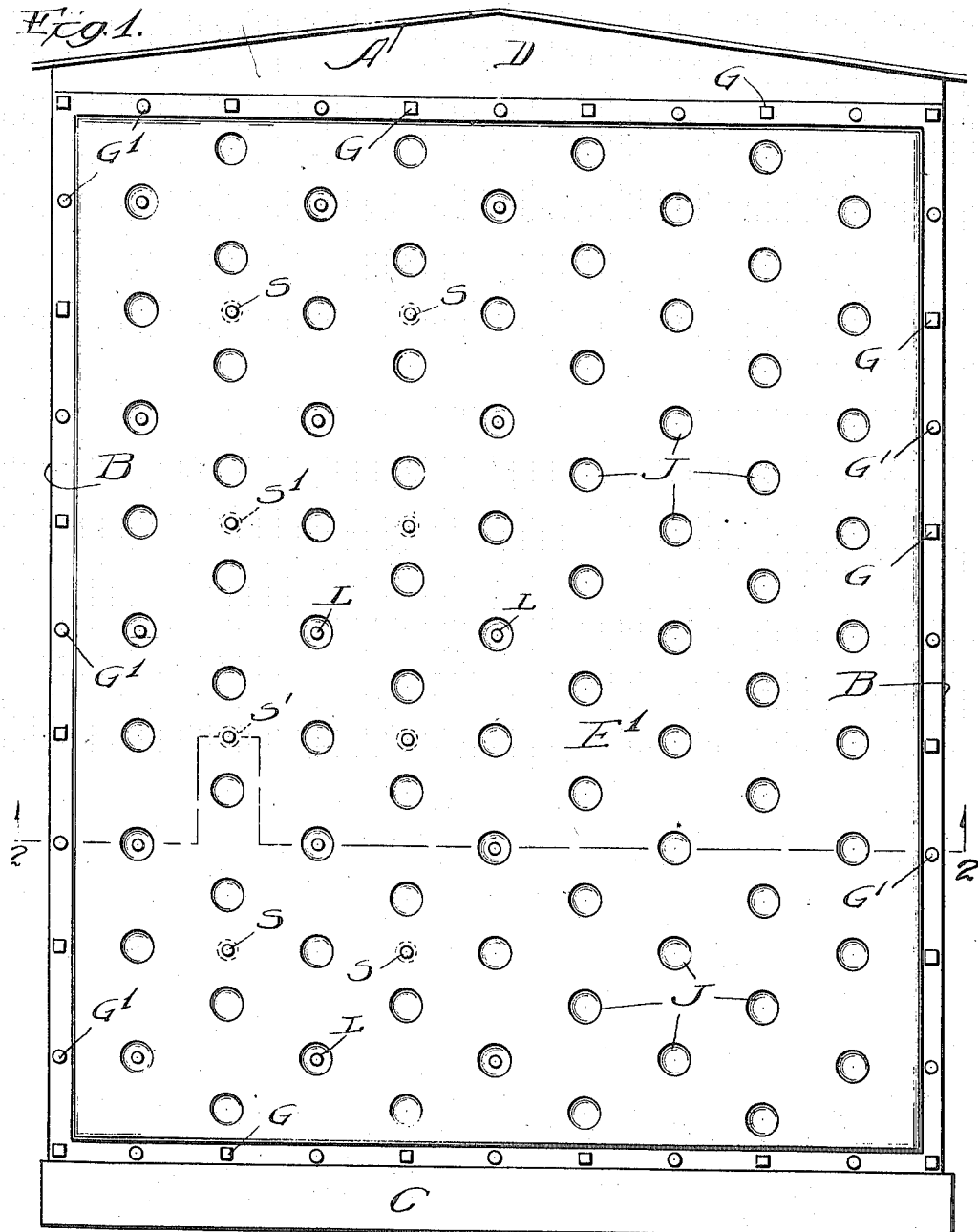
Figure 2:
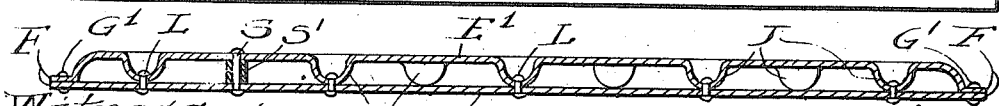

Figure 1 is an elevation of a car showing my car end attached thereto; Fig. 2 is a horizontal section on the line 2—2 of Fig. 1.

Like parts are indicated by the same letter in both figures.

A is the roof of the car, B, B the sides thereof, C the end sill and D a plate between the roof of the car and the car end proper.

E, E¹ are two plates arranged in parallel but separated planes and terminating in flat contiguous edges F, F, so as to form for the entire structure a flat edge suitable for its attachment to the car.

The car end may be attached to the frame in any desired manner, as for example by bolts or by rods G, G and these or the rivets G¹, G¹ should be arranged in such manner as to secure the two plates together at their edges.

J, J are a series of nipples or depressions formed on one plate, preferably the outer plate, by depressing the surface thereof to such depth as to cause such nipples to engage the inner surface of the opposite plate. Thus I provide between the two plates a series of spacers integral with one of the plates. The plates may be secured together in any desired manner in any desired form, as for example, by bolts S, S through the plates, or by bolts L, L through the nipples, or by some form of welding or heating process at the point where the nipples engage the opposite plate.

In the preferred form of the structure shown wherein one plate is flat the other provided with a bent rim, the one plate has nipples which engage the flat surface of the other plate.

I do not, of course, desire to be limited to the particular size, proportion, arrangement and structure of the several parts and wish my drawings to be taken as in a sense diagrammatic. Doubtless great changes could be made in these particulars without departing from the spirit of my invention.

The use and operation of my invention are as follows:—The two plates formed and attached together as here indicated, make up a complete plate whose two members form between them an insulation space, and which strengthen each other so as to make a stiff end. The car end so formed has an outer flat edge whereby it may be attached to the car by devices which pass through both plates, though of course this particular arrangement is not indispensable. I have shown the bolts S surrounded by spacers S¹ which may be desirable in the event of such bolts being used between the plates. A car section like that illustrated is strongly braced against pressure in either direction, is insulated and is easily attached, either side in. Of course the plates can be secured at their edges only or at some of their other parts only, but in the preferred form a certain number of indentations or nipples would be secured, preferably by welding, and the edges would be secured together at certain points preferably by bolts. The entire car end structure could be sectional, proper provision being made to attach the parts together.

I have described my invention as a car end. It will be obvious, however, that except for such arrangements as are made for the attachment of the plate or plates to the car end, the sheet metal structure is equally applicable for any other purpose and particularly for the building up of the sides of cars. I wish, therefore, my expression car end, so far as it applies to the sheet metal structure itself, at least to be understood as relating to and covering sheet metal structures of the kind suitable for car ends or for other purposes.

In this case I have spoken throughout of car ends, but the invention is equally applicable to other sections or portions of the car, as, for instance, car doors or sections of the car sides, as the case might be.

I claim:

1. A car end comprising two plates in separated but parallel planes, one of them provided with depressions or bosses which contact with the other so as to act as spacers and means for securing the two plates together, the edges of said plates contiguous to each other and arranged so as to form flat spaces to engage the car frame.

2. A car end comprising two plates in separated but parallel planes, one of them provided with depressions or bosses which contact with the other so as to act as spacers and means for securing the two plates together, the edge of one plate dish-shaped.

3. A car end comprising two plates in separated but parallel planes, one of them provided with depressions or bosses which contact with the other so as to act as spacers and means for securing the two plates together, the edges of said plates contiguous to each other and arranged so as to form flat spaces to engage the car frame, the edge of one plate dish-shaped.

4. A car end comprising two plates in separated but parallel planes, one of them provided with depressions or bosses which contact with the other so as to act as spacers and means for securing the two plates together, separate and removed from said bosses.

5. A car end comprising two plates in separated but parallel planes, one of them provided with depressions or bosses which contact with the other so as to act as spacers and means for securing the two plates together, the edges of said plates contiguous to each other and arranged so as to form flat spaces to engage the car frame.

6. A car end comprising two plates in separated but parallel planes, one of them provided with depressions or bosses which contact with the other so as to act as spacers, the edges of said plates contiguous to each other and arranged so as to form flat spaces to engage the car frame, said plates secured by spot welding contiguous portions.

In testimony whereof, I affix my signature in the presence of two witnesses this 29th day of September 1915.

CHARLES W. DAKE.

Witnesses:
 MINNIE M. LINDENAU,
 ESTHER VAN FRANK.